United States Patent [19]

Gerber

[11] Patent Number: 4,488,750
[45] Date of Patent: Dec. 18, 1984

[54] ADJUSTABLE WINDSHIELD FOR A VEHICLE

[76] Inventor: Curtis E. Gerber, 1115 Twiggs St., Tampa, Fla. 33602

[21] Appl. No.: 427,609

[22] Filed: Sep. 29, 1982

[51] Int. Cl.³ .............................................. B60J 1/04
[52] U.S. Cl. .................................... 296/78 R; 49/197
[58] Field of Search .................. 296/78 R, 79, 84 R, 296/84 A, 84 D; 49/197; 280/DIG. 5

[56] References Cited

U.S. PATENT DOCUMENTS

| | | | |
|---|---|---|---|
| 3,992,816 | 11/1976 | Skahill | 49/197 |
| 4,014,589 | 3/1977 | Yerkey | 296/78 R |
| 4,109,956 | 8/1978 | Roman | 296/78 R |
| 4,389,057 | 6/1983 | Richard, Jr. | 296/78 R |

Primary Examiner—Robert R. Song
Attorney, Agent, or Firm—Frijouf, Rust & Pyle

[57] ABSTRACT

An adjustable windshield for a vehicle is disclosed. The windshield includes a first upright and a second upright disposed in spaced parallel relationship to the first upright. A first channel member is removably connected to the first upright and a second channel member removably secured to the second upright. A windshield is secured adjacent the channel members and extends between the same. A first side member is disposed coplanar with and adjacent to the first upright. A second side member is disposed coplanar with the second upright and parallel to the first side member. A first and a second pull loop are secured adjacent the first and second channel members respectively enabling the windshield to be moved from a first position in which the channel members are connected to the uprights to a second position in which the channel members are connected to the side members.

32 Claims, 13 Drawing Figures

ADJUSTABLE WINDSHIELD FOR A VEHICLE

BACKGROUND OF THE INVENTION

1. Field of the Invention

This invention relates to adjustable windshields for vehicles. More specifically, this invention relates to adjustable windshields for golf carts or the like.

2. Description of the Prior Art

Due to the considerable distances between respective tees and greens in golf courses, motorized vehicles have been produced to facilitate transportation of golfing enthusiasts. Such golf carts have proved popular with young and old alike and their utility has extended to that of local transportation, particularly where residential communities have been built in the vicinity of golf courses. Often the electric powered golf cart has been found more practical for a short journey to the local shops than the automobile counterpart.

However, because of the lightweight construction of prior art golf carts and the like, weather protection has been limited to either flexible translucent covers or to lightweight plastic screens. Although it is desirable to have some type of weather protection to deflect the wind or rain from occupants of the golf cart of the like, such prior art covers and screens have proved somewhat cumbersome. Considerable effort has been required in connection with the prior art covers and screens in the erection or storage of the same.

The adjustable windshield of the present invention overcomes the aforementioned inadequacies of the prior art devices by providing a simple and low cost windshield that will easily be moved from an operative first position in which this shield will deflect the wind and/or rain from the occupants of the golf cart to a second inoperative position in which the windshield is stowed adjacent the roof of the golf cart or the like.

Various prior art devices have been proposed to provide a measure of weather protection to the occupants of a golf cart or the like. Among such prior art proposals, U.S. Pat. No. 3,992,816 teaches a window tracking mechanism including a windshield which is operatively connected to two pairs of rollers. The rollers are designed to follow the pattern of the front frame and the top frame of the vehicle such that the windshield is slid rearwardly onto the top frame.

Similarly, U.S. Pat. No. 1,529,601 discloses another window tracking mechanism in which the upper portion of the windshield is operatively connected to a horizontal track which enables the windshield to be slid rearwardly thereon for storage.

Although the prior art devices give the required degree of weather protection to the occupants of the golf cart of the like, they have suffered from several problems associated with the relatively complex tracking systems. It is the primary object of the invention to provide an adjustable windshield that overcomes the aforementioned inadequacies of the prior art devices and provides an improvement which significantly contributes to the reliability and ease with which the occupants of the golf cart or the like can move the windshield from an operative to an inoperative position adjacent the roof of the golf cart or the like.

Another object of the invention is to provide an adjustable windshield for a golf cart or the like that is extremely simple in construction and is cheaper to produce than the prior art proposals.

Another object of the present invention is the provision of an adjustable windshield that can easily be stowed out of use by the user of the golf cart or the like.

Another object of the invention is the provision of a windshield for a golf cart or the like which can easily by retrofitted onto an existing golf cart or the like.

Another object of this invention is the provision of an adjustable windshield for a golf cart or the like which will be securely located in the stowed position without the possibility of rattling or scuffing against the existing roof structure of the golf cart or the like.

Another object of the invention is the provision of an adjustable windshield that can easily be manufactured in kit form for subsequent shipment in packed form to local distributors who can quickly assemble the windshields to existing golf carts or the like.

The foregoing has outlined some of the more pertinent objects of the present invention. These objects should be construed to be merely illustrative of some of the more pertinent features and applications of the invention. Many other beneficial results can be attained by applying the disclosed invention in a different manner or modifying the invention within the scope of the disclosure. Particularly with regard to the use of the invention disclosed herein, this should not be construed to limited to adjustable windshields for golf carts, but should include adjustable windshields for lightweight side-by-side bicycles, tractors, invalid carriages, police patrol carts, traffic warden carts and the like.

SUMMARY OF THE INVENTION

The adjustable windshield of the present invention is defined by the appended claims with a specific embodiment shown in the attached drawings. For the purpose of summarizing the invention, the invention relates to an adjustable windshield for golf carts or the like. The adjustable windshield includes a first upright and a second upright disposed in spaced parallel relationship to the first upright. A first channel member is removably connected to the first upright and a second channel member is removably connected to the second upright. A windshield is secured adjacent the channel members and extends between the same. A first side member is disposed coplanar with and adjacent to the first upright. A second side member is disposed coplanar with the second upright and parallel to the first side member. The windshield is movable from a first position in which the channel members are connected to the uprights to a second position in which the channel members are connected to the side members.

In a more specific embodiment of the invention, the uprights are of tubular metallic construction and the channel members include a first channel which removably connects with and receives a respective upright when in the first position and a respective side member when in the second position. The channel members also include a second channel for the reception of the edges of the windshield such that the windshield is secured to and extends between the channel members. The windshield which is of translucent material is rectangular in configuration and is moveable from a first position with the uprights located within the respective first channels of the channel members to a second position within the side members located within the respective first channels of the channel members. Pull loops are secured adjacent these channel members to facilitate movement of the windshield from the first to the second position. Joints are disposed between respective uprights and side members and the ends of the side members adjacent the joints include hemispherical plugs for bearing against the windshield during movement of the windshield from the first to the second position. A locking bracket is secured adjacent the windshield to lock the windshield to a second cross member which extends between the side members when the windshield is in the second position. The locking bracket also locks the windshield to a first cross member which extends between the joints when the windshield is in the first position.

The foregoing has outlined rather broadly the more pertinent and important features of the present invention in order that the detailed description of the invention that follows may be better understood so that the present contribution to the art can be more fully appreciated. Additionally, features of the invention will be disclosed or described hereinafter which form the subject of the claims of the invention. It should be appreciated by those skilled in the art that the conception and specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following description taken in conjunction with the accompanying drawings in which.

Similar reference characters refer to similar parts throughout the several views of the drawings.

DETAILED DESCRIPTION

Figure 1:
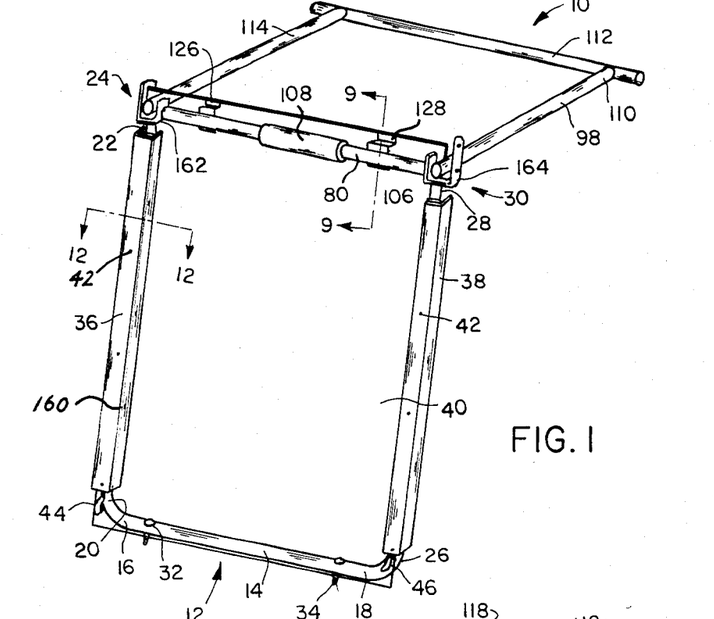
FIG. 1 is a perspective view of the adjustable windshield according to the present invention.

FIG. 1 is a perspective view of an adjustable windshield generally designated 10 comprising a front frame generally designated 12 of U-shaped configuration. The frame 12 includes a base 14 having a first and a second end 16 and 18, respectively. A first upright 20 extends from the first end 16 of the base 14 and the distal end 22 of upright 20 is secured to a first joint generally designated 24. A second upright 26 extends from the second end 18 of the base 14 and the distal end 28 of the upright 26 is secured to a second joint generally designated 30. Anchor bolts 32 and 34, respectively, secure the base 14 to the body work of the golf cart or the like, not shown.

A first channel member 36 is removably connected to the upright 20 and a second channel member 38 is removably connected to the upright 26. A translucent windshield 40 of rectangular configuration extends between and is secured to channel members 36 and 38. The windshield 40 is secured to the channel members 36 and 38 by fasteners 42. Pull loops 44 and 46 are secured respectively to the channel members 36 and 38.

Figure 2:
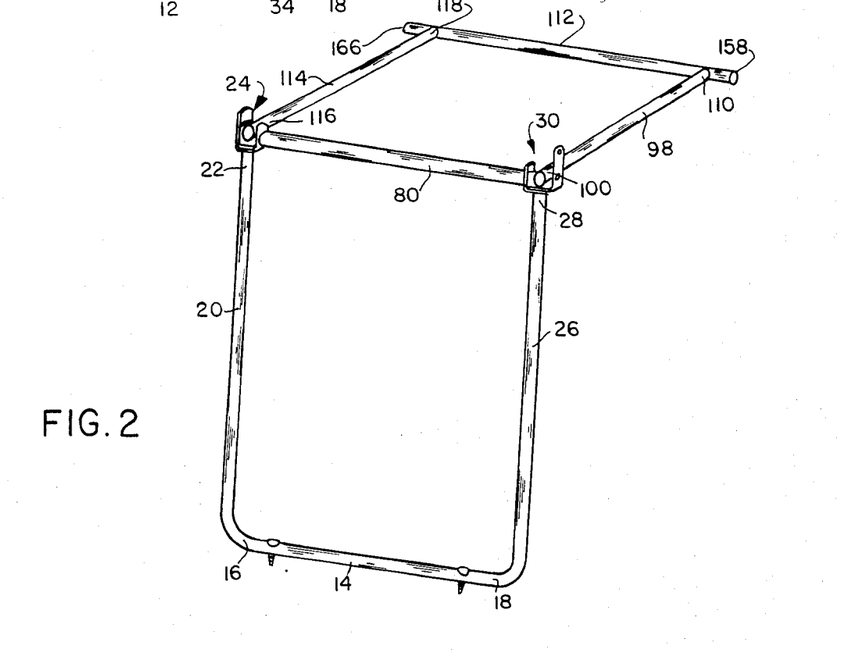
FIG. 2 is a perspective view of the tubular framework of the windshield shown in FIG. 1.

FIG. 2 shows the framework of the adjustable windshield with the windshield 40 and channel members 36 and 38 removed.

Figure 3:
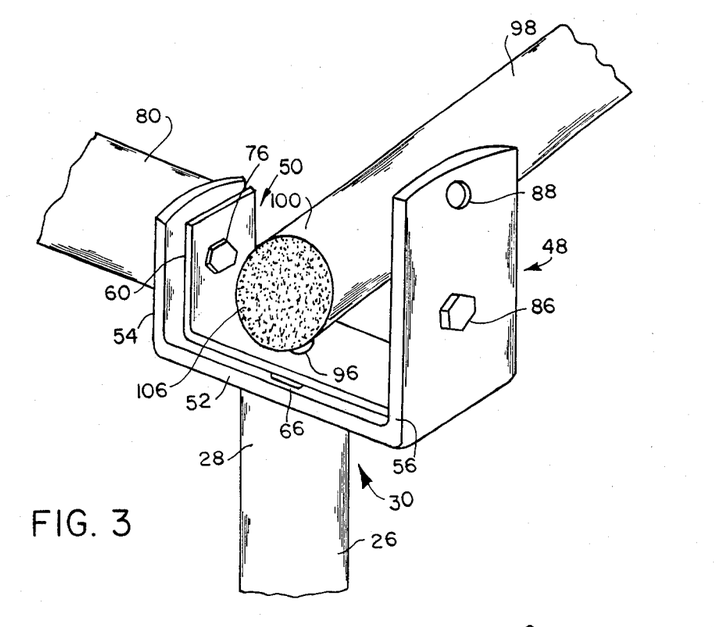
FIG. 3 is an enlarged perspective view of one of the joints shown in FIG. 1.
Figure 6:
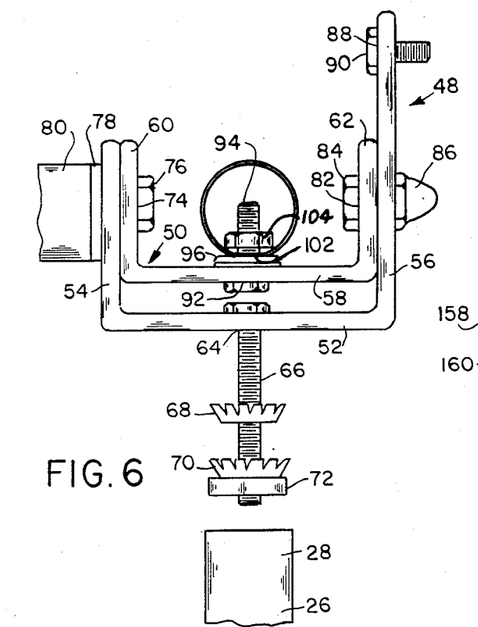
FIG. 6 is a front elevational view of the joint shown in FIG. 3 with an exploded view of the upright connecting means.

FIG. 3 is a perspective view in detail of the second joint 30 comprising a J-shaped bracket generally designated 48 and a bridge generally designated 50. The J-shaped bracket 48 includes a bracket base 52, a short arm 54 and a long arm 56. The bridge 50 includes a bridge base 58 from which first and second bridge limbs 60 and 62 extend as shown in FIG. 6. The bridge 50 extends between the short arm 54 and the long arm 56 of the J bracket 48. The bracket base 52 defines a third aperture 64 through which the threaded stem of a bolt 66 passes. The threaded stem of the bolt 66 engages a first and a second jamb nut 68 and 70, respectively, and a nylon wedge guide 72. The jamb nuts 68 and 70 and the wedge guide 72 cooperate with the stem of bolts 66 to engage the internal surface of the distal end 28 of the second upright 26 and lock the same relative to the bracket base 52. The short arm 54 and the first limb 60 of the J-shaped bracket 48 and the bridge 50, respectively, define a first aperture 74. The first aperture 74 receives the threaded stem of a bolt 76. The threaded stem of bolt 76 threadably engages a nylon terminal wedge nut 78 which is disposed at one end of a first cross member 80. The wedge nut 78 is disposed within the end of cross member 80 such that rotation of the bolt 76 expands the wedge nut 78 against the internal surface of the cross member 80 to lock the same relative to the short arm 54 of the J bracket 48. The long arm 56 of the J bracket 48 and the second limb 62 of the bridge 50 define aligned second apertures 82. The apertures 82 receive a threaded bolt 84 with a cap nut 86 threadably engaging the stem of bolt 84 to secure the second limb 62 to the long arm 56 of the J bracket 48. The long arm 56 of the J bracket 48 defines a further aperture 88 which receives a bolt 90 for securing the joint 30 to the roof of the cart. The bridge base 58 defines a fourth aperture 92 which receives a threaded bolt 94. The stem of bolt 94 passes through spacer washers 96. A second side member 98 shown more particularly with reference to FIG. 3, includes an end 100 disposed adjacent the second joint 30. The end 100 defines a fifth aperture 102 shown most clearly in FIG. 6 through which the stem of bolt 94 passes. A nut 104 disposed within the end 100 cooperates with the stem of bolt 94 to lock the end 100 of the second side member 98 adjacent the bridge base 58. The end 100 of the second side member 98 includes a hemispherical plug 106 shown in FIG. 3 of plastics material for bearing against the windshield 40 during movement of the same. The first joint 24 is an identical mirror image in construction to the second joint 30.

The first cross member 80 extends between the first and second joints 24 and 30, respectively, and is secured to the short arms of the respective J brackets. An antifriction sleeve 108 is slipped over the cross member 80 prior to securing the cross member 80 to the joints 24 and 30. The sleeve 108 prevents the windshield 40 from being scuffed by contact with the cross member 80, particularly during movement of the windshield relative to the frame. The sleeve 108 is of a soft fabric such as lambs wool or cloth.

The second side member 98 includes a first end 100 and a second end 110. The second end of side member 98 is secured to a second cross member 112. A first side member 114 also includes a first and a second end 116 and 118, respectively. The first end 116 is secured to the first joint 24 and the second end 118 is secured to the second cross member 112 such that the second cross member 112 extends between the second ends 110 and 118 of the first and second side members 98 and 114, respectively.

Figures 5, 7:
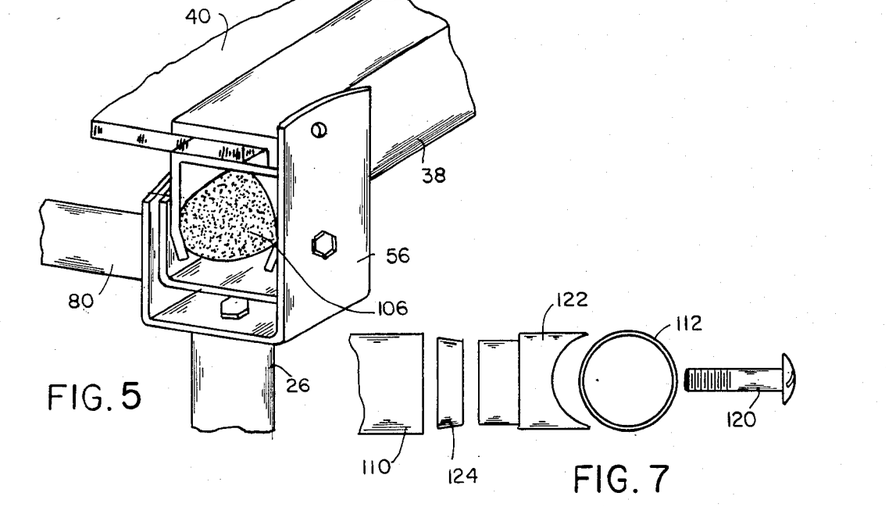
FIG. 5 is a perspective view of the joint shown in FIG. 3 with the windshield disposed in the second position.
FIG. 7 is an exploded view of the connection between a side member and the second cross member.

FIG. 7 is an exploded view of the second end 110 of the second side member 98 and the means for securing end 110 to the second cross member 112. The stem of a bolt 120 passes through aligned apertures defined by the second cross member 112 and through an aperture defined by a saddle terminal 122 to engage the internally threaded bore of a wedge nut 124. The nut 124 and part of the terminal 122 engage the internal surface of the first side member 98 such that rotation of the bolt 120 locks the second end of first side member 98 adjacent the second cross member 112. A similar locking device secures the second end 118 of the second side member 114 adjacent the second cross member 112.

A first and a second locking bracket 126 and 128, respectively, are secured to the windshield 40 as shown in FIG. 1. The second locking bracket 128 is shown in enlarged cross section with reference to FIG. 9. The second locking bracket generally designated 128 includes a locking bracket base 130 and a first and a second spaced wall 132 and 134, respectively, extending from opposed edges of the locking bracket base. The locking bracket base 130 and the walls 132 and 134 define therebetween a locking bracket channel 136. The locking bracket base defines an aperture which is aligned with an aperture defined by the windshield 40 for the reception of a fastener 138. A cushion 140 is secured within channel 136 adjacent the bracket base 130.

Figures 10, 11, 13:
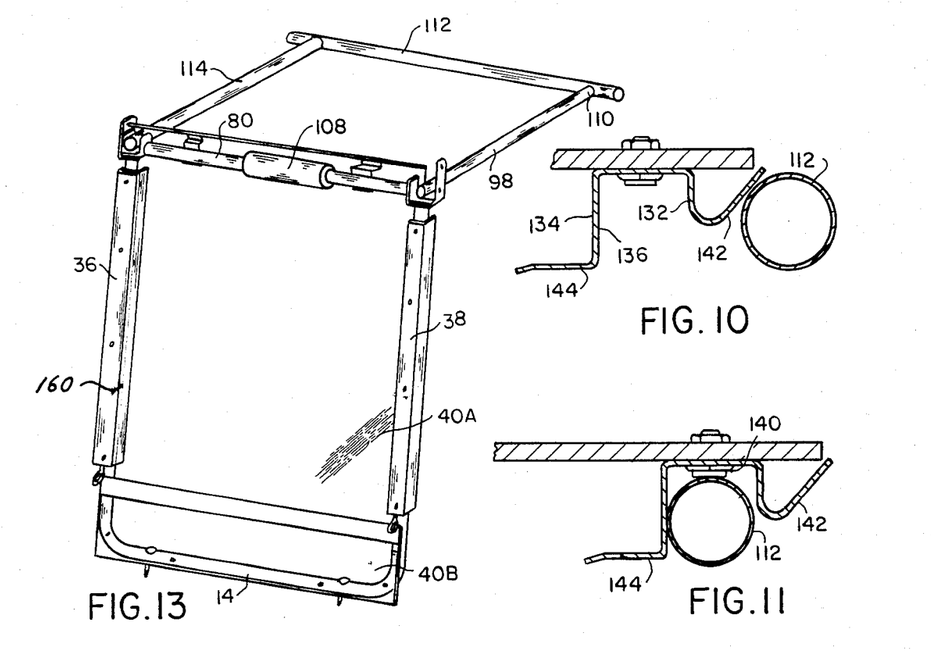
FIG. 10 is an enlarged cross sectional view of the same locking bracket shown in FIG. 9 but in a position prior to engagement of the locking bracket with the second cross member.
FIG. 11 is a cross sectional view of the locking bracket shown in FIG. 9 when the windshield is disposed in the second position.
FIG. 13 is a perspective view of a further embodiment of the present invention showing a supplementary windshield.

A distal edge of the first wall 132 is disposed in angular relationship relative to a ramp 142 such that when the windshield 40 is moved to the second position in which the windshield is stowed adjacent the roof of the cart, the ramp 142 guides the second cross member 112 into engagement within the locking bracket channel 136 as shown more particularly with reference to FIG. 10. When the second cross member 112 is disposed within the channel 136 as shown in FIG. 11, the cushion 140 abuts against the cross member 112 inhibiting relative movement between the cross member 112 and the locking bracket 128.

Figures 8, 9:
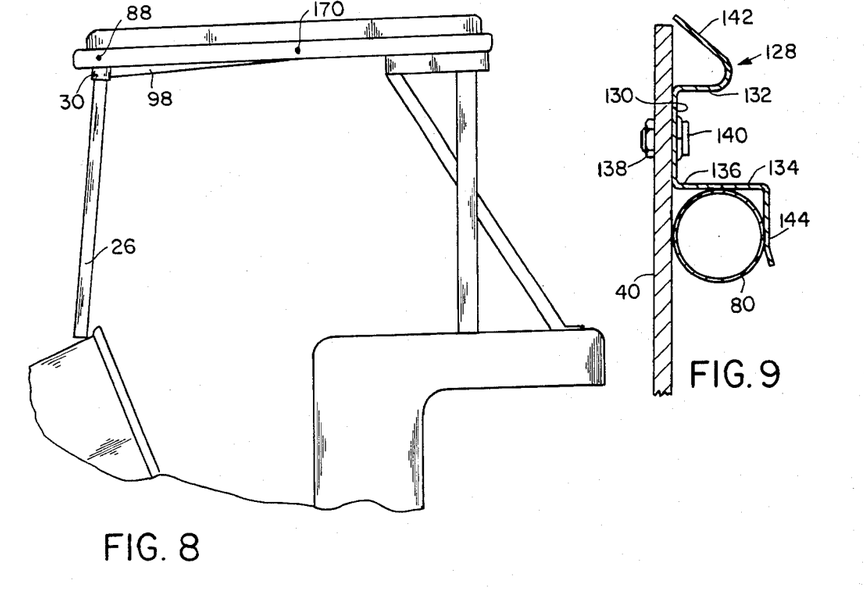
FIG. 8 is a side elevational view of the typical cart showing the tubular framework connected thereto.
FIG. 9 is an enlarged cross sectional view of the locking bracket taken on the line 9—9 of FIG. 1.

A distal edge of the second wall 134 is disposed adjacent a retainer 144. The retainer is disposed in a plane substantially parallel to the plane of the windshield 40. The retainer 144 guides the windshield relative to the first cross member 80 and releasably locks the windshield 40 to the cross member 80 when the windshield is disposed in the first position as shown in FIG. 9.

Figure 12:
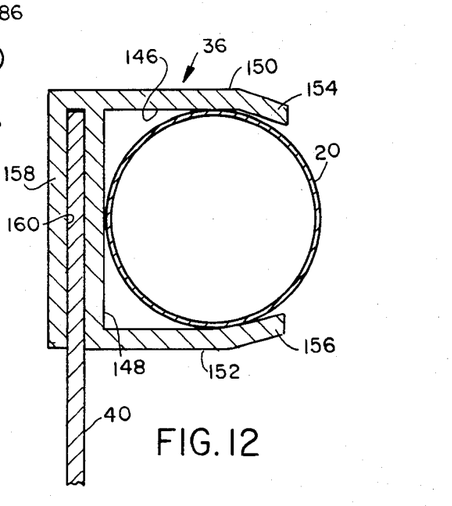
FIG. 12 is an enlarged cross sectional view taken on the line 12—12 of FIG. 1.

FIG. 12 is a cross sectional view of the first channel member 36. Channel member 36 defines a first channel 146 which removably receives the first upright 20. The channel member 36 includes a channel base 148 and a first and a second rib 150 and 152, respectively, extending from the channel base 148. The distal edges 154 and 156 of ribs 150 and 152, respectively, are flared inwardly towards each other.

The channel base 148, ribs 150 and 152, and flared edges 154 and 156 are of such dimensions that they define the first channel 146 and frictionally engage the upright 20 when the windshield 40 is disposed in the first position.

A third rib 158 extends from the juncture of the channel base 148 and the first rib 150. A portion of the third rib 158 is disposed substantially parallel to the channel base 148 and is spaced therefrom to define a second channel 160 therebetween for the reception of the edge of the windshield 40.

The second channel member 38 is identical to channel member 36 and the windshield 40 extends between the channel members 36 and 38, the edges of the windshield being disposed within the respective second channels of the channel members. The channel means 36 and 38 may be of extruded plastics material and the uprights 20 and 26 may be of tubular metallic material. Additionally, the side members 98 and 114 are of the same dimensions as the uprights 20 and 26 so that the first channels of the channel members can releasably engage the side members 98 and 114 when the windshield is in the second position.

Figure 4:
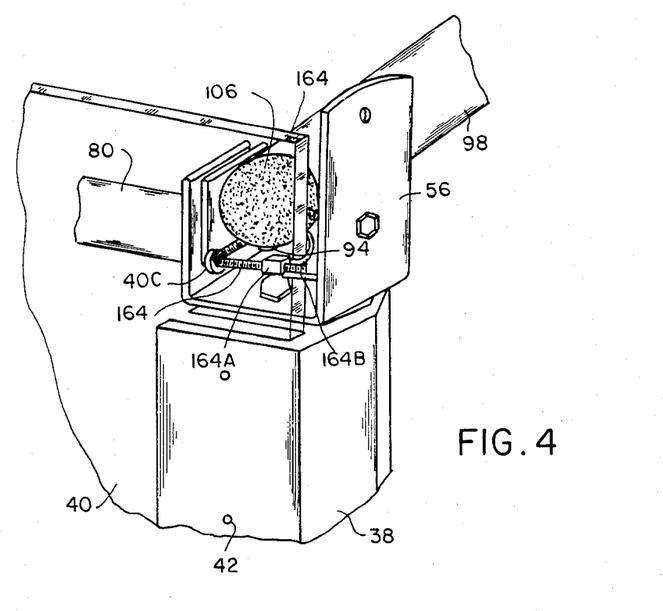
FIG. 4 is a perspective view of the joint shown in FIG. 3 with the windshield disposed in the first position.

Tie tags 162 and 164 are disposed adjacent the channel members and pass around the adjacent side members to maintain connection of the windshield 40 to the side members 98 and 114 during movement of the windshield from the first to the second position. The tag 164 shown best in FIG. 4 comprises a fastener 164A for receiving a tab 164B in a locking engagement. The tag 164 extends through an aperture 40C in the windshield 40. The tag 164 is disposed about the bolt 94 when the windshield 40 is in the first position as shown in FIG. 4 and is disposed about the side member 98 during movement from the first to the second position. The tags 162 and 164 function as hinges when the windshield 40 is moved from the second position shown in FIG. 5 to the first position upon tag 164 engaging bolt 94 enabling windshield 40 to pivot downwardly in FIG. 1.

An alternative embodiment of the adjustable windshield is shown with reference to FIG. 13. The alternative embodiment is similar to that of the embodiment described hereinbefore. However, in the alternative embodiment, the windshield 40a is not as deep as the windshield 40. A supplementary windshield 40b is permanently secured to the lower portion of the U-shaped frame. The adjustable windshield 40a overlaps the upper margin of the supplementary windshield 40b to inhibit the flow of wind therebetween. The supplementary windshield of the alternative embodiment enables the adjustable windshield kit to be compactly packaged in a packaging container of smaller dimensions than that required for the packaging of the first described embodiment. Because the adjustable windshields of the present invention are supplied in kit form for retrofitting to existing carts, it is important that the windshield parts be dimensioned to fit standard type carts. The alternative embodiment can be packaged more compactly than the first embodiment and can be shipped at a considerably lower cost relative to the cost of shipping the package of the first embodiment. The supplementary windshield 40b may be of darkened or tinted material if this is required by, for example, a woman owner of the cart for purposes of modesty.

The adjustable windshield of the present invention is retrofitted to an existing golf cart or the like shown representatively in FIG. 8. As a first step in fitting the adjustable windshield to an existing cart, the aperture 88 of the second joint 30 is positioned adjacent the roof of the cart and an aligned hole is drilled in the roof to permit bolt 90 to anchor the long arm 56 of the joint 30 relative to the roof. The first joint is similarly anchored to the other side of the roof. The second step includes drilling holes in the body of the cart in alignment with the anchor bolts 32. The base 14 of the frame 12 is then anchored to the body of the cart. Finally, the extremities 166 and 168 of the second cross member 112 are anchored to the roof by fasteners 170, one of which is shown in FIG. 8.

In operation of the windshield, the windshield 40 is disposed in the first position shown in FIG. 4 with the first channels of the first and second channel members 36 and 38 connected to the first and second uprights 20 and 26, respectively. In the first position, the retainer 144 of each locking bracket secures the top of the windshield relative to the cross member 80 with the top of the windshield 40 pressing against the sleeve 108.

In order to move the windshield 40 to the second position as shown in FIG. 5, the pull loops 44 and 46 are pulled forwardly relative to the uprights 20 and 26 to pull the channel members 36 and 38 out of engagement with the uprights 20 and 26. With the uprights 20 and 26 completely disengaged from the respective first channels 146, the windshield is pivoted outwardly about the first cross member 80. The cross member 80 is disposed between the retainer 144 and the windshield 40 during pivoting of the windshield 40. When the windshield 40 has been pivoted into a position in which it is disposed in the same plane as the plane of the cross members 80 and 112 and side members 98 and 114, the windshield is pushed inwardly such that the hemispherical plugs 106 engage the first channels 146 of the channel members 36 and 38. Further pushing of the windshield 40 inwardly causes the plugs 106 to be guided within the first channels 146 and for the first channels 146 to frictionally engage the side members 98 and 114. At the same time, rearward movement of the windshield 40 results in a disengagement of the retainers 144 from the cross member 80. As the windshield is progressively pushed rearwardly between the side members 98 and 114 and the roof of the cart, the sleeve 108 inhibits scratching of the internal surface of the windshield.

When the windshield has been pushed rearwardly a considerable distance, the ramp 142 of the locking brackets 126 and 128 come into engagement with the second cross member 112. Continued rearward pushing of the windshield results in the locking of the cross member 112 within the locking bracket channel 136. In this locked condition, the windshield has assumed the second position in which the windshield is stowed just below the roof of the cart and is prevented from rattling by virtue of the cushions 140 reacting with the cross member 112. Tie tags 162 and 164 maintain connection between the windshield 40 and the side members 98 and 114 during movement of the windshield from the first to the second position.

With the windshield 40 in the second position, the side members 98 and 114 are engaged respectively by channel members 38 and 36. However, in order to move the windshield 40 from the second position to the first position, it is necessary to push the windshield upwardly in the region of the second cross member 112 in order to release the second cross member 112 from engagement with the locking bracket channels 136. When the windshield has been disengaged from the second cross member 112, the windshield is then pulled forward by means of the pull loops until the first cross member 80 is engaged between the retainers 144 and the windshield 40. The windshield is then pivoted downwardly and pushed inwardly to press the uprights into the respective channels of the channel members.

The adjustable windshield of the present invention provides a retrofitted windshield for a golf cart or the like that is very easy to fit to a variety of different style carts. The invention provides a low cost kit that, when assembled to a golf cart or the like, offers a degree of weather protection not obtained in many prior art devices. The adjustable windshield of the present invention also provides an easily operated device that is extremely simple in design and rugged in construction and which will not rattle or vibrate in use.

The present disclosure includes that contained in the appended claims as well as that of the foregoing description. Although the invention has been described in its preferred form with a certain degree of particularity, it is understood that the present invention of the preferred form has been made only by way of example, that numerous changes in the details of construction and the combination and arrangement of parts may be resorted to without departing from the spirit and scope of the invention.

What is claimed is:

1. An adjustable windshield for a vehicle, comprising in combination:
   a first upright;
   a second upright disposed in spaced parallel relationship to said first upright;
   a first channel member removably connected to said first upright;
   a second channel member removably connected to said second upright;
   a windshield secured to and extending between said channel members;
   a first side member disposed coplanar with and connected to said first upright;
   a second side member disposed coplanar with and connected to said upright, said second side member being parallel to said first side member; and
   means for moving said windshield from a first position in which said channel members are connected to said uprights to a second position in which said channel members are connected to said side members.

2. An adjustable windshield as set forth in claim 1 wherein said channel members each define a first channel disposed along the length of each respective channel member.

3. An adjustable windshield as set forth in claim 2 wherein said first channels of said first and said second channel members, respectively, removably receive said first and said second uprights.

23. An adjustable windshield as set forth in claim 11 wherein a locking bracket is secured to said windshield, said locking bracket removably locking said windshield relative said first cross member when said windshield is in said first position.

24. An adjustable windshield as set forth in claim 23 wherein said locking bracket includes a locking bracket base and a first and a second spaced wall, said wall extending from opposing edges of said locking bracket base, said locking bracket base and said walls defining therebetween a locking bracket channel, said locking bracket channel receivably engaging said second cross member when said windshield is in said second position.

25. An adjustable windshield as set forth in claim 24 wherein said locking bracket base defines a locking bracket aperture, said locking bracket aperture receivably engaging a fastener for securing said locking bracket to said windshield.

26. An adjustable windshield as set forth in claim 25 wherein said locking bracket base further includes a cushion disposed within said locking bracket channel, said cushion inhibiting relative movement between said locking bracket and said second cross member when said windshield is disposed in said second position.

27. An adjustable windshield as set forth in claim 26 wherein a distal edge of said wall is disposed in angular relationship relative to a ramp, said ramp cooperating with said second cross member during movement of said windshield from said first position to said second position, said ramp guiding said second cross member into engagement within said locking bracket channel.

28. An adjustable windshield as set forth in claim 27 wherein a distal edge of said second wall is disposed adjacent a retainer, said retainer being disposed in a plane substantially parallel to the plane of said windshield, said retainer guiding and removably locking said first cross member between said retainer and said windshield during movement of said windshield to said first position and when said windshield is located in said first position, respectively.

29. An adjustable windshield as set forth in claim 11 wherein said means for bearing against said windshield is a substantially hemispherical plug of anti-friction material.

30. An adjustable windshield for a vehicle comprising in combination:
a frame, said frame including a base;
a first end of said base;
a tubular first upright extending from said first end of said base;
a distal end of said first upright;
a first joint secured adjacent said distal end of said first upright;
a second end of said base, said second end being disposed remote from said first end of said base;
a tubular second upright extending from said second end of said base, said second upright being disposed parallel to said first upright;
a distal end of said second upright;
a second joint secured adjacent said distal end of said second upright;
a first channel member removably cooperating with said first upright;
a second channel member removably cooperating with said second upright;
a windshield secured to and extending between said first and said second channel members;
a first tubular cross member extending between said first and said second joints;
a tubular first cross member, said first side member including a first and a second end, said first end of said first side member being secured adjacent said first joint;
a tubular second side member disposed parallel to said first side member, said second side member including a first and a second end, said first end of said second side member being secured adjacent said second joint;
a second cross member, said second cross member extending between said second ends of said side members; and
means for moving said windshield from a first position in which said channel members cooperate with said uprights to a second position in which said channels cooperate with said side members.

31. An adjustable windshield as set forth in claim 30 wherein a locking bracket is secured to said windshield, said locking bracket removably locking said windshield relative said first cross member when said windshield is in said first position.

32. An adjustable windshield as set forth in claims 1 or 11 or 30 wherein each of said channel members includes a tie tag secured thereto, said tie tags being secured to adjacent side members to maintain connection of said windshield to said side members during movement of the same from said first position to said second position.

* * * * *

UNITED STATES PATENT AND TRADEMARK OFFICE
CERTIFICATE OF CORRECTION

PATENT NO. : 4,488,750

DATED : December 18, 1984

INVENTOR(S) : Curtis E. Gerber

It is certified that error appears in the above-identified patent and that said Letters Patent are hereby corrected as shown below:

In the Claims

Claim 9, line 30, after "second" insert -- channel --.

Claim 10, line 35, after "second" insert --channel--.

Claim 10, line 36, delete "member" and insert therein --members--.

Signed and Sealed this

Eighteenth Day of June 1985

[SEAL]

*Attest:*

DONALD J. QUIGG

*Attesting Officer*     *Acting Commissioner of Patents and Trademarks*